United States Patent Office 3,348,941
Patented Oct. 24, 1967

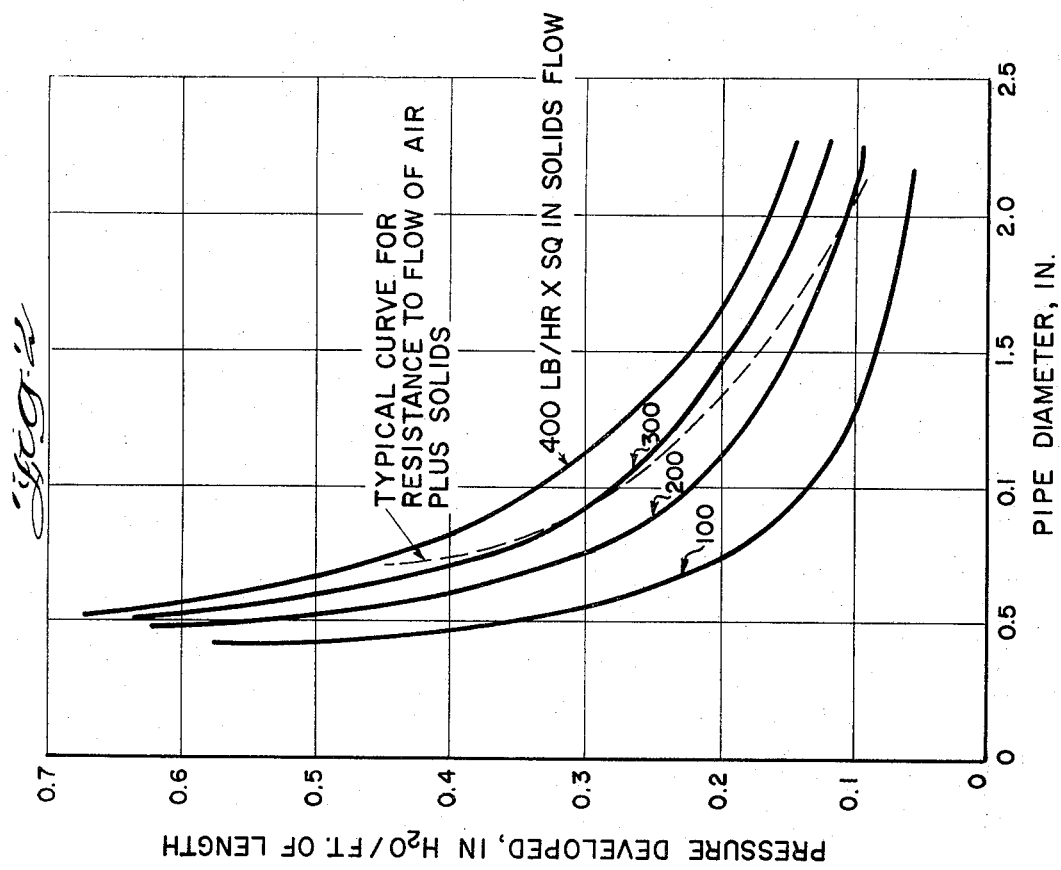
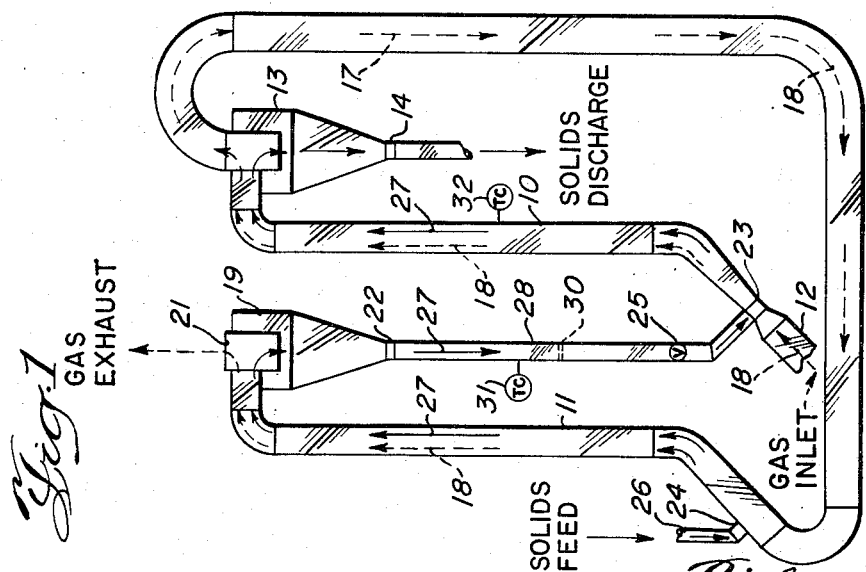

3,348,941
PRESSURE BALANCING METHOD
Richard E. King, Duluth, Minn., assignor of one-half to Northern Natural Gas Company, Omaha, Nebr., a corporation of Delaware, and one-half to W. S. Moore Company, Duluth, Minn., a corporation of Minnesota
Filed Sept. 15, 1964, Ser. No. 396,603
The portion of the term of the patent subsequent to Mar. 22, 1983, has been disclaimed
3 Claims. (Cl. 75—26)

This is a continuation-in-part of the present inventor's application Ser. No. 250,386, filed Jan. 9, 1963, now Patent No. 3,190,744.

The present invention relates generally to methods for treating small-sized solid particles with a gas which may be chemically or thermally reactive with the particles; and, more particularly, to a method in which the pressure losses resulting from movement of the gases and/or solids through an enclosed system are compensated or balanced to prevent short circuiting of the gas moving through the system.

A method in accordance with the present invention is practiced in conjunction with an apparatus including a first riser, a second riser, a first gas-solids separator at the top of the first riser, a second gas-solids separator at the top of the second riser, means communicating the top of the first separator with the bottom of the second riser, a conduit extending downwardly from the second separator toward the bottom of the first riser, and means defining a junction for the bottom of the downwardly extending conduit and the bottom of the first riser.

Fresh gas is introduced into the junction for movement along an enclosed gas path defined by the first riser, the first separator, the communicating means, and the second riser, into the second separator. This is the desired gas path. However, because gas moving along the enclosed desired path undergoes a drop in pressure (due to friction losses, for example), the gas pressure at the beginning of said path (the junction) is less than the gas pressure at the end of said path (the second separator), and it is possible for gas to short circuit from the junction upwardly, through the downwardly extending conduit into the second separator, in the absence of some compensating factor.

In accordance with the present invention, movement of gas through the downwardly extending conduit is prevented by providing a pressure drop, at the junction, equal to the loss in gas pressure resulting from the movement of gas along the desired path. This pressure balancing step, to be described subsequently in greater detail, effectively prevents short circuiting of gas upwardly through the downwardly extending conduit.

In accordance with the method of the present invention, fine-sized solid material is introduced into the system at the bottom of the second riser. The solids are suspended in the gas and conveyed upwardly into the second separator from which the gas is exhausted and the solids are directed through the downwardly extending conduit into the junction at the bottom of the first riser.

In the junction, solids are suspended in fresh gas and conveyed upwardly through the first riser into the first separator from which the solids are discharged. Movement of gas-suspended solids along portions of the gas path (i.e. the first and second risers), causes a gas pressure drop above and beyond that resulting from the movement of gas alone through the system. Accordingly, the gas pressure at the beginning of the gas path (the junction) is more than the gas pressure at the end of the gas path (the second separator), and, in the absence of some compensating factor, this pressure differential causes short circuiting of gas from the junction upwardly through the downwardly extending conduit into the second separator.

In accordance with the present invention, such short circuiting is prevented by providing a pressure increase in the downwardly extending conduit, from the top to the bottom thereof, equal to the pressure drop resulting from the movement of solids through the system. This pressure-balancing step will be described subsequently in greater detail.

The two pressure-balancing steps, performed at the junction and in the downwardly extending conduit, respectively, effectively prevent undesired movement of gas through the downwardly extending conduit.

Other features and advantages are inherent in the method claimed and disclosed and will be apparent to those skilled in the art from the following detailed description in conjunction with the accompanying diagrammatic drawings wherein:

FIGURE 1 is a schematic illustration of an embodiment of apparatus in which the method of the present invention is performed; and FIGURE 2 is a graph illustrating the pressure increase developed by movement of solids through a downwardly extending conduit or enclosed passage.

A method in accordance with the present invention may be performed in conjunction with apparatus illustrated in FIGURE 1, which apparatus comprises a first upwardly extending riser 10, a second upwardly extending riser 11, a fresh-gas inlet 12 at the lower end of first riser 10, and a cyclone separator 13 for separating gas from solid particles at the upper end of first riser 10. From the top of separator 13 extends communicating means or conduit 17 which communicates with the lower end of second riser 11, and the upper end of riser 11 communicates with a cyclone separator 19 having a gas outlet 21 and an outlet 22 for discharging solid particles.

Communicating with the bottom of second riser 11 at 24 is a downwardly extending conduit 26 for introducing small particle size materials (e.g., iron ore finer than standard 10 mesh) into the system.

Communicating with a solid discharge outlet 22 on second separator 19 is the upper end of a downwardly extending conduit 28. The lower end of conduit 28 communicates with a venturi 23 at the lower end of first riser 10, said venturi constituting a junction for the bottom of conduit 28 and the bottom of first riser 10.

In accordance with the method of the present invention, a stream of gases (indicated by dotted lines 18) is continuously introduced through inlet 12 for movement along a gas path, defined by first riser 10, first separator 13, communicating conduit 17 and second riser 11, into separator 19 from which the gas is finally discharged or exhausted through gas outlet 21. Solid materials are fed into the system at 24 through conduit 26 whereby the solids are suspended in the gas and conveyed upwardly (lines 27) concurrently with the stream of gas to separator 19. The solid particles are discharged from separator 19 through outlet 22 into downwardly extending conduit 28 which directs the solids into venturi 23 at the bottom of riser 10. The solid particles are suspended in fresh gas at venturi 23 and flow upwardly, concurrently with gases introduced through inlet 12, to separator 13. The solid particles are discharged from separator 13 through an outlet 14. The velocity of the gas stream is regulated to suspend the fine particle size materials and convey them through the risers to the separators. This gas velocity is dependent largely upon the particle size and density.

It will thus be seen that the solid particles and gas flow concurrently as they pass upwardly through risers 10 and 11, although the overall flow of the solids is countercurrent to the flow of gases in that the solid particles are introduced into the lower end of second riser 11 and are then passed through first riser 10 before being discharged while the gas flow is just the opposite. The introduction of solids through solids feed conduit 26 is from a sealed system (to prevent gas leakage through conduit 26). Solids flow through conduit 26 may be started at a relatively low rate and gradually increased to the proper operating level. Also, if desired, a suitable valve 25 may be provided in conduit 28 whereby the flow of gas through conduit 28 is restrained until the system is placed in operation. That is, valve 25 would be gradually moved to open position after a solids feed rate has been established. Also, solids discharge outlet 14 is connected to a solids discharge system which restricts the flow of gas into and out of the system.

Gas introduced at 12 may be chemically reactive with the solid particles. For example, the solid particles could be iron ore (e.g., $Fe_2O_3$) and the gas a hot reducing gas (e.g., a partially combusted natural gas free of uncombined oxygen), in which case the ore particles would undergo reduction as they move upwardly through first riser 10, suspended in the reducing gas. In such a case the hot exhaust gas conveyed from first separator 13 to second riser 11 could be used to pre-heat ore particles moving upwardly in second riser 10; and the gas in second separator 19 would be a spent gas from the standpoint of both chemical and thermal activity.

The enclosed gas path defined by first riser 10, first separator 13, communicating conduit 17 and second riser 11 is the desired path along which it is intended that the gas move from gas inlet 12 to second separator 19. It is undesirable for gas from gas inlet 12 to short circuit at junction 23 through conduit 28 into separator 19 because then the gas could not perform its intended function of conveying the solid particles upwardly through riser 10; and much of the gas would be wasted. Moreover, it is undesirable for gas which has followed the desired path into separator 19, to descend downwardly through conduit 28 to junction 23 and into the bottom of riser 10 because, in situations where the gas has reacted chemically or thermally with solids particles suspended in the gas, the gas in separator 19 is spent gas, and spent gas descending through conduit 28 will dilute the fresh gas entering at inlet 12 and interfere with the performance of the function of the fresh gas.

Thus it is important to prevent movement of gas in either direction, upwardly or downwardly through conduit 28.

There is a problem with short circuiting by gas upwardly through conduit 28, and this problem can best be understood by reference to FIGURE 1 of the drawings in the application. Assuming gas alone is introduced into gas inlet 12, as the gas (dotted line 18) flows along the path defined by the first riser 10, first separator 13, communicating means 17 and second riser 11 into second separator 19, there will be a gas pressure drop, due to friction losses, for example. Accordingly, the pressure in second separator 19 (the end of the gas path) will be less than the pressure at junction 23 (the beginning of the gas path). Therefore, gas introduced through gas feed inlet 12 will, in the absence of some correcting factor, tend to short circuit at junction 23 through conduit 28 into separator 19.

Trying to solve this problem by locating a mechanical seal, such as a rotary air lock or a trickle valve, in conduit 28 would be undesirable because the elevated temperature and/or reactive gas in the system would cause rapid failure of mechanical devices and require frequent replacement.

In accordance with the present invention, movement of gas through conduit 28 is prevented by providing, at venturi or junction 23, a pressure drop equal to the pressure-drop of the gas flowing along the desired gas path (defined by first riser 10, first separator 13, communicating conduit 17 and second riser 11). Inclusion in the method of such a pressure-dropping step, at said junction, effectively prevents the above-described short circuiting of the gas into the second separator.

The pressure-dropping step necessary to balance the pressure loss resulting from the movement of gases through the system, can be performed by venturi 23 if the cross-section of the venturi interior is properly constructed, it being well known that the static pressure within a venturi decreases in proportion to a decrease in the cross-sectional area of the venturi. The proper construction of venturi 23 may be performed in the following manner. A plate, indicated by dotted lines 30, is placed across conduit 28 to prevent the movement of gas through conduit 28; and gas is introduced at inlet 12 for movement along the desired path defined by first riser 10, separator 13, conduit 17 and second riser 11. The gas pressure in conduit 28 above plate 30 and the gas pressure in conduit 28 below plate 30 are measured. The difference between the gas pressure above plate 30 and the pressure below plate 30 is equal to the difference between gas pressure at the beginning of said path and gas pressure at the end of said path, and equals the pressure drop resulting from movement of gas alone along said path.

The interior of venturi 23 is then sized by, for example, trowelling wet, hardenable cement-like material along the interior walls of the venturi until the interior cross-sectional dimensions of venturi 23 are such that there is no pressure difference between the pressure readings above and below plate 30, in conduit 28. The interior of venturi 23 may be sized to give the proper pressure drop utilizing expedients other than a wet cement-like, hardenable material, but this expedient has proved to be eminently satisfactory in practice.

When there is no difference between the pressure readings above and below plate 30, in conduit 28, this is an indication that the pressure drop at venturi 23 is equal to the pressure drop resulting from the movement of gas alone along the desired gas path. Once the proper construction of venturi 23 has been effected, plate 30 is removed and the apparatus is in condition to be operated in accordance with the method of the present invention.

Another problem which must be overcome in order to prevent movement of gas through conduit 28 is the pressure drop resulting from the movement of solid material through the system. More specifically, referring to FIGURE 1, when solids are conveyed through risers 10 and 11, there is a pressure drop in these risers above and beyond that caused by the movement of gas alone through the system; and this additional pressure drop is not offset by the pressure-balancing step provided by venturi 23, which step only offsets the pressure drop caused by gas movement through the system. Thus the pressure in second separator 19 would be less than the pressure at junction 23 by an amount equal to the pressure drop caused by the solids. Without a compensating step, this additional pressure drop could cause short circuiting of gas from the junction upwardly through conduit 28.

In accordance with the present invention, short circuiting of gas upwardly through conduit 28, resulting from the pressure drop caused by the movement of solids through the system, is prevented by providing a pressure increase in conduit 28, from top to bottom thereof, equal to the pressure drop resulting from the movement of solids through the risers. This pressure-increasing step takes advantage of the fact that the fall of solid material, from separator 19 through conduit 28 to venturi 23, develops a pressure gradient within conduit 28, with the pressure increasing from the top to the bottom of conduit 28. The amount of pressure developed depends upon the size of the downcomer and the rate of flow through the downcomer.

FIGURE 2 shows that the gas pressure developed at the bottom of a standpipe by the flow of solids is directly proportional to the length of the standpipe and increases with increasing rate of solids flow and decreasing pipe diameter.

The pressure developed is indicated in FIGURE 2 by inches of water, on a water gauge, over the length of the conduit, measured in feet. The solid employed in obtaining the results shown in FIGURE 2 was minus 20 mesh iron ore. The curves in FIGURE 2 show that the pressure developed is much reduced in larger diameter pipe, such as would be used in commercial operation. However, a compensating factor is that the resistance offered to gas-solids flow in the risers and other parts of the system will also be reduced in larger diameter pipes, as shown by the dashed line in FIGURE 2. Accordingly, the pressure developed by falling solids would be equally useful in a small system or in a large commercial system to prevent upward flow of gas through the solids downcomer 28.

Therefore, a properly selected length and cross-sectional area for conduit 28 for the desired rate of flow therethrough will provide a pressure increase, from top to bottom of conduit 28, equal to the pressure drop caused by the solid material moving through the risers 10 and 11. This prevents such short circuiting of gas upwardly through conduit 28 as would be caused by the pressure drop due to the movement of solid material through the system.

Thus, by providing a pressure decrease, at the venturi 23, equal to the pressure drop resulting from movement of gas alone through the system, and by providing a pressure increase, from top to bottom of the downwardly extending conduit 28, equal to the pressure drop resulting from movement of solids through the system, a balance is provided which prevents movement of gas, either upwardly or downwardly, through conduit 28. As a result, none of the gas introduced at the gas inlet 12 is short circuited upwardly through conduit 28; and none of the gas passing along the desired path into separator 19 moves downwardly through conduit 28 to dilute the fresh gas introduced into the bottom of riser 10. All of the fresh gas introduced into the bottom of riser 10 moves along the desired path, undiluted, and performs its intended function with a minimum of gas waste.

The movement of hot gases and solids through venturi 23 will gradually erode away the interior of venturi 23, and eventually this erosion will proceed to such an extent that it will alter the size and configuration of the venturi interior to something other than that which provides the desired pressure drop. In such a case, the gas may short circuit upwardly through conduit 28. In accordance with an embodiment of the present invention, the time when the venturi 23 has eroded away to an extent which causes such undesired short circuiting may be determined by monitoring the temperature within conduit 28.

Normally, the temperature within conduit 28 will be relatively low compared to the temperature in riser 10. This is because hot gases are normally passing through riser 10 while the only substance passing through conduit 28 is the solids which, at the time they pass through conduit 28, are normally at a temperature substantially below the temperature of the gas in riser 10. However, if there is a substantial rise in the temperature in conduit 28, approaching that of the temperature in riser 10, this is an indication that there is short circuiting of gas upwardly through conduit 28, and an indication that venturi 23 has eroded away beyond that which will provide the desired pressure drop necessary to prevent such short circuiting of gas. When such an indication occurs, operation of the method and apparatus should be shut down and the venturi rebuilt in accordance with the procedure set forth above. The temperature in conduit 28 may be monitored by a thermocouple located at 31, and the temperature in riser 10 may be monitored by a thermocouple located at 32.

The foregoing detailed description has been given for clearness of understanding only, and no unnecessary limitations should be understood therefrom, as modifications will be obvious to those skilled in the art.

What is claimed is:

1. A pressure balancing method for use in conjunction with an apparatus including a first riser, a second riser, a first gas-solids separator at the top of the first riser, a second gas-solids separator at the top of the second riser, means communicating the top of the first separator with the bottom of the second riser, a conduit extending downwardly from the second separator toward the bottom of the first riser and means defining a junction for the bottom of the downwardly extending conduit and the bottom of the first riser; said method comprising the steps of:

introducing gas into said junction for movement along an enclosed gas path defined by said first riser, said first separator, said communicating means and said second riser, into said second separator, whereby said gas undergoes a pressure drop as it moves along said path;

exhausting said gas from said second separator;

and providing a pressure drop, at said junction, equal to the pressure drop resulting from movement of said gas along said enclosed gas path, whereby movement of gas through said downwardly extending conduit is prevented;

said last-recited step including utilizing the movement of said gas through said junction to provide said pressure drop;

and measuring the temperature in said first riser and in said downwardly extending conduit to provide an indication of gas movement upwardly through the downwardly extending conduit;

and when said temperature measurement indicates an upward movement of gas in said downwardly extending conduit, adjusting the pressure drop at said junction to prevent said upward movement of gas.

2. A method as recited in claim 1 and comprising the further steps of:

introducing solid particles at the bottom of the second riser;

suspending said solid particles in said gas moving through the second riser;

conveying the suspended solid particles upwardly through the second riser into the second separator;

separating the solid particles from the gas in the second separator;

passing the solid particles, separated in the second separator, downwardly through said downwardly extending conduit into the junction, without interruption along the entire length of said conduit, said gas introduced at said junction being hotter than the solid particles passing downwardly thru the downwardly extending conduit;

suspending the solid particles in said gas introduced into said junction;

conveying the suspended solid particles upwardly through the first riser;

separating the suspended solid particles from the gas in the first separator;

removing the solid particles from the first separator;

and providing a pressure increase, from the top to the bottom of the downwardly extending conduit, equal to the pressure drop resulting from the movement of the suspended solids through the first and second risers whereby movement of the gas through the downwardly extending conduit is prevented;

said last-recited step including utilizing the uninterrupted descent of the solid particles through said conduit to provide said pressure increase.

3. A pressure balancing method for use in conjunction with an apparatus including a first riser, a second riser, a first gas-solids separator at the top of the first riser, a second gas-solids separator at the top of the second riser, means communicating the top of the first separator with the bottom of the second riser, a conduit extending downwardly from the second separator toward the bottom of the first riser and means defining a junction for the bottom of the downwardly extending conduit and the bottom of the first riser; said method comprising the steps of:
introducing gas into said junction for movement along an enclosed gas path defined by said first riser, said first separator, said communicating means and said second riser, into said second separator;
introducing solid particles at the bottom of the second riser;
suspending said solid particles in said gas moving through the second riser;
conveying the suspended solid particles upwardly through the second riser into the second separator;
separating the solid particles from the gas in the second separator;
exhausting said gas from said second separator;
passing the solid particles, separated in the second separator, downwardly through said downwardly extending conduit into the junction, without interruption along the entire length of said conduit, said gas introduced at said junction being hotter than the solid particles passing downwardly thru the downwardly extending conduit;
suspending the solid particles in said gas introduced into said junction;
conveying the suspended solid particles upwardly through the first riser;
separating the suspended solid particles from the gas in the first separator;
removing the solid particles from the first separator;
and providing a pressure increase, from the top to the bottom of the downwardly extending conduit, equal to the pressure drop resulting from the movement of the suspended solids through the first and second risers, whereby movement of the gas through the downwardly extending conduit is impeded;
said last-recited step including utilizing the uninterrupted descent of the solid particles through said conduit to provide said pressure increase;
and measuring the temperature in said first riser and in said downwardly extending conduit to provide an indication of gas movement upwardly through the downwardly extending conduit;
and when said temperature measurement indicates an upward movement of gas in said downwardly extending conduit, adjusting said pressure increase to prevent said upward movement of gas.

References Cited

UNITED STATES PATENTS

| | | | |
|---|---|---|---|
| 1,450,903 | 4/1923 | Newhouse | 302—35 X |
| 2,118,252 | 5/1938 | Kraft | 34—10 X |
| 2,343,780 | 3/1944 | Lewis | 75—26 |
| 2,399,984 | 5/1946 | Caldwell | 75—26 |
| 2,424,147 | 7/1947 | Campbell | 34—10 X |
| 2,750,276 | 6/1956 | Marshall | 75—26 |
| 2,795,860 | 6/1957 | Wright | 34—10 |
| 2,870,003 | 1/1959 | Cavanough | 75—26 |
| 3,241,824 | 3/1966 | King | 266—20 |

FOREIGN PATENTS

| | | |
|---|---|---|
| 333,383 | 11/1958 | Switzerland. |
| 690,527 | 4/1953 | Great Britain. |

DAVID L. RECK, *Primary Examiner.*

H. W. TARRING, *Assistant Examiner.*